(12) United States Patent
Mizutani et al.

(10) Patent No.: US 9,221,495 B2
(45) Date of Patent: Dec. 29, 2015

(54) STEERING CONTROL DEVICE AND ELECTRICALLY POWERED VEHICLE

(75) Inventors: Ryoji Mizutani, Nishikamo-gun (JP); Michitaka Tsuchida, Susono (JP); Yasuaki Tahara, Nagoya (JP); Yuki Tojima, Chita-gun (JP); Shigetaka Isogai, Nishio (JP)

(73) Assignees: TOYOTA JIDOSHA KABUSHIKI KAISHA, Aichi-ken (JP); AISIN SEIKI KABUSHIKI KAISHA, Aichi-ken (JP)

( * ) Notice: Subject to any disclaimer, the term of this patent is extended or adjusted under 35 U.S.C. 154(b) by 1231 days.

(21) Appl. No.: 12/097,393

(22) PCT Filed: Dec. 12, 2006

(86) PCT No.: PCT/JP2006/325147
§ 371 (c)(1),
(2), (4) Date: Jun. 13, 2008

(87) PCT Pub. No.: WO2007/069763
PCT Pub. Date: Jun. 21, 2007

(65) Prior Publication Data
US 2009/0093931 A1 Apr. 9, 2009

(30) Foreign Application Priority Data
Dec. 16, 2005 (JP) .................. 2005-363164

(51) Int. Cl.
*B60K 7/00* (2006.01)
*B62D 6/00* (2006.01)
*B62D 9/00* (2006.01)
(Continued)

(52) U.S. Cl.
CPC .............. *B62D 9/005* (2013.01); *B60K 7/0007* (2013.01); *B60L 3/0092* (2013.01); *B60L 15/2036* (2013.01); *B62D 5/003* (2013.01); *B62D 9/002* (2013.01); *B60K 17/046* (2013.01); *B60K 2007/0038* (2013.01); *B60K 2007/0092* (2013.01); *B60L 2220/44* (2013.01); *Y02T 10/7275* (2013.01)

(58) Field of Classification Search
CPC ............................ B62D 5/003; B60K 17/046
USPC ............ 701/41, 42; 116/31; 180/6.2, 6.5, 6.6, 180/408–412
See application file for complete search history.

(56) References Cited

U.S. PATENT DOCUMENTS 4,172,505 A * 10/1979 Rabus et al. .................. 180/290
5,376,868 A    12/1994 Toyoda et al.
(Continued)

FOREIGN PATENT DOCUMENTS

JP    59-141405 U    9/1984
JP    05-328542 A    12/1993
(Continued)

*Primary Examiner* — John Q Nguyen
*Assistant Examiner* — Anshul Sood
(74) *Attorney, Agent, or Firm* — Sughrue Mion, PLLC

(57) ABSTRACT

Motor-generators are incorporated in front wheels and drive the front wheels, respectively. An ECU determines whether or not a steering apparatus including a steering actuator, a tie rod and a steering angle sensor has failed, based on an operation angle of a steering wheel from a steering wheel angle sensor and a steering angle of the front wheels from the steering angle sensor. When the ECU determines that the steering apparatus has failed, the ECU provides torque difference for a torque instruction for the motor-generators in accordance with the operation angle of the steering wheel.

9 Claims, 3 Drawing Sheets

(51) Int. Cl.
*B60L 3/00* (2006.01)
*B60L 15/20* (2006.01)
*B62D 5/00* (2006.01)
*B60K 17/04* (2006.01)

(56) References Cited

U.S. PATENT DOCUMENTS

| | | | |
|---|---|---|---|
| 5,453,930 A * | 9/1995 | Imaseki et al. | 701/22 |
| 5,549,172 A * | 8/1996 | Mutoh et al. | 180/65.1 |
| 5,554,969 A * | 9/1996 | Eguchi | 340/438 |
| 5,656,921 A * | 8/1997 | Farrall | 322/40 |
| 5,720,533 A * | 2/1998 | Pastor et al. | 303/147 |
| 5,731,669 A * | 3/1998 | Shimizu et al. | 318/139 |
| 6,073,071 A * | 6/2000 | Yasue et al. | 701/51 |
| 6,209,677 B1 * | 4/2001 | Bohner et al. | 180/406 |
| 6,415,212 B2 * | 7/2002 | Nishizaki et al. | 701/41 |
| 6,429,780 B1 * | 8/2002 | Yazawa et al. | 340/686.3 |
| 6,450,287 B1 * | 9/2002 | Kurishige et al. | 180/446 |
| 6,519,518 B1 * | 2/2003 | Klein et al. | 701/41 |
| 6,768,932 B2 * | 7/2004 | Claypole et al. | 700/279 |
| 7,578,361 B2 * | 8/2009 | Thacher | 180/6.3 |
| 7,694,777 B2 * | 4/2010 | Yamashita et al. | 180/443 |
| 2001/0033106 A1 * | 10/2001 | Shirai et al. | 303/177 |
| 2002/0161499 A1 * | 10/2002 | Radamis et al. | 701/41 |
| 2003/0114969 A1 * | 6/2003 | Dominke et al. | 701/41 |
| 2004/0204803 A1 * | 10/2004 | Matsuda et al. | 701/22 |
| 2007/0043490 A1 * | 2/2007 | Yokota et al. | 701/41 |
| 2007/0233345 A1 * | 10/2007 | Endo et al. | 701/41 |
| 2007/0284180 A1 * | 12/2007 | Suehiro et al. | 180/444 |
| 2008/0208407 A1 * | 8/2008 | Tanaka et al. | 701/41 |
| 2009/0026004 A1 * | 1/2009 | Hidaka et al. | 180/446 |
| 2010/0076650 A1 * | 3/2010 | Spadafora et al. | 701/43 |

FOREIGN PATENT DOCUMENTS

| | | | |
|---|---|---|---|
| JP | 06-335115 A | 12/1994 | |
| JP | 07-007816 A | 1/1995 | |
| JP | 07267108 A * | 10/1995 | B62D 5/04 |
| JP | 09-084215 A | 3/1997 | |
| JP | 09-117016 A | 5/1997 | |
| JP | 2000-052955 A | 2/2000 | |
| JP | 2000-053015 A | 2/2000 | |
| JP | 2000-190863 A | 7/2000 | |

* cited by examiner

STEERING CONTROL DEVICE AND ELECTRICALLY POWERED VEHICLE

TECHNICAL FIELD

The present invention relates to a steering control device and an electrically powered vehicle, and more particularly to a steering control technique for an electrically powered vehicle in which left and right front wheels are driven with separate motors respectively.

BACKGROUND ART

Japanese Patent Laying-Open No. 9-117016 discloses an electric vehicle in which left and right front wheels are driven with separate motors respectively. In the electric vehicle, the left and right front wheels are driven with separate motors respectively and torque distribution between left and right motors is varied based on steering of a steering wheel.

According to the electric vehicle, as an effect equivalent to that of power steering can be obtained by varying torque distribution between the left and right motors, the need for a power steering system can be obviated.

On the other hand, Japanese Patent Laying-Open No. 9-117016 does not consider measures against failure of a steering apparatus providing a steering angle to the front wheels. Namely, if the steering apparatus fails, the vehicle can no longer run.

In particular in a steering apparatus adopting a steer-by-wire system that has attracted attention in recent years, as the steering wheel and the front wheels are mechanically separate, improvement in reliability of the steering system is an important issue.

DISCLOSURE OF THE INVENTION

The present invention was made to solve the above-described problems, and an object of the present invention is to provide a steering control device capable of ensuring a steering function if an already-existing steering apparatus fails.

In addition, another object of the present invention is to provide an electrically powered vehicle capable of ensuring a steering function if an already-existing steering apparatus fails.

According to the present invention, a steering control device includes: a steering wheel; first and second motors; a failure determination portion, and a control portion. The first and second motors drive left and right front wheels respectively. The failure determination portion determines whether or not a steering apparatus providing a steering angle to the front wheels in accordance with an operation angle of the steering wheel has failed. When the failure determination portion determines that the steering apparatus has failed, the control portion produces torque difference in accordance with the operation angle of the steering wheel in output torque of the first and second motors.

In the steering control device according to the present invention, when the steering apparatus providing a steering angle to the front wheels has failed, the torque difference in accordance with the operation angle of the steering wheel is produced in the output torque of the first and second motors. Therefore, the torque difference in accordance with the operation angle of the steering wheel is produced in the left and right front wheels and torque steer in accordance with the torque difference is produced.

Therefore, according to the steering control device in the present invention, even when the steering apparatus fails, the steering function can be ensured. Consequently, reliability of the steering system is improved.

Preferably, the steering apparatus adopts a steer-by-wire system in which the steering wheel and the front wheels are mechanically separate.

In the steering control device, as the steering apparatus adopts the steer-by-wire system, a mechanical link mechanism between the steering wheel and an actuator providing the steering angle to the front wheels is not necessary.

Therefore, according to the steering control device, while enjoying advantages of the steer-by-wire system such as improvement in a degree of freedom in steering layout or a smaller size of the steering apparatus, reliability of the steering system can be improved.

Preferably, the steering control device further includes a steering angle sensor detecting a steering angle of the front wheels. The failure determination portion determines whether or not the steering apparatus has failed, based on the steering angle detected by the steering angle sensor and the operation angle of the steering wheel.

In addition, according to the present invention, an electrically powered vehicle includes: a power storage apparatus; first and second motors; a steering wheel; a steering apparatus; a failure determination portion; and a control portion. The first and second motors drive left and right front wheels respectively, by receiving electric power supplied from the power storage apparatus. The steering apparatus provides a steering angle to the front wheels in accordance with an operation angle of the steering wheel. The failure determination portion determines whether or not the steering apparatus has failed. When the failure determination portion determines that the steering apparatus has failed, the control portion produces torque difference in accordance with the operation angle of the steering wheel in output torque of the first and second motors.

In the electrically powered vehicle according to the present invention, the left and right front wheels are driven separately by the first and second motors respectively. If the steering apparatus providing the steering angle to the front wheels fails, the torque difference in accordance with the operation angle of the steering wheel is produced in the output torque of the first and second motors. Therefore, the torque difference in accordance with the operation angle of the steering wheel is produced in the left and right front wheels and torque steer in accordance with the torque difference is produced.

Therefore, according to the electrically powered vehicle in the present invention, even when the steering apparatus fails, the steering function can be ensured. Consequently, reliability of the vehicle is improved.

Preferably, the first motor is provided in a wheel of the right front wheel, and the second motor is provided in a wheel of the left front wheel.

In the electrically powered vehicle, each of the first and second motors is implemented by what is called an in-wheel motor provided within a wheel of the front wheel. Therefore, according to the electrically powered vehicle, while enjoying various advantages as the in-wheel motor, such as effective use of a space that has conventionally been occupied by a drive system (such as a transmission or a differential gear), reliability of the vehicle can be improved.

As described above, according to the present invention, if the steering apparatus providing the steering angle to the front wheels fails, the torque difference in accordance with the operation angle of the steering wheel is produced in the output torque of the first and second motors for torque steer control. Therefore, even if the steering apparatus fails, the steering function can be ensured. Accordingly, even if the already-existing steering apparatus fails, the vehicle can continue to run.

BEST MODES FOR CARRYING OUT THE INVENTION

Figure 1:
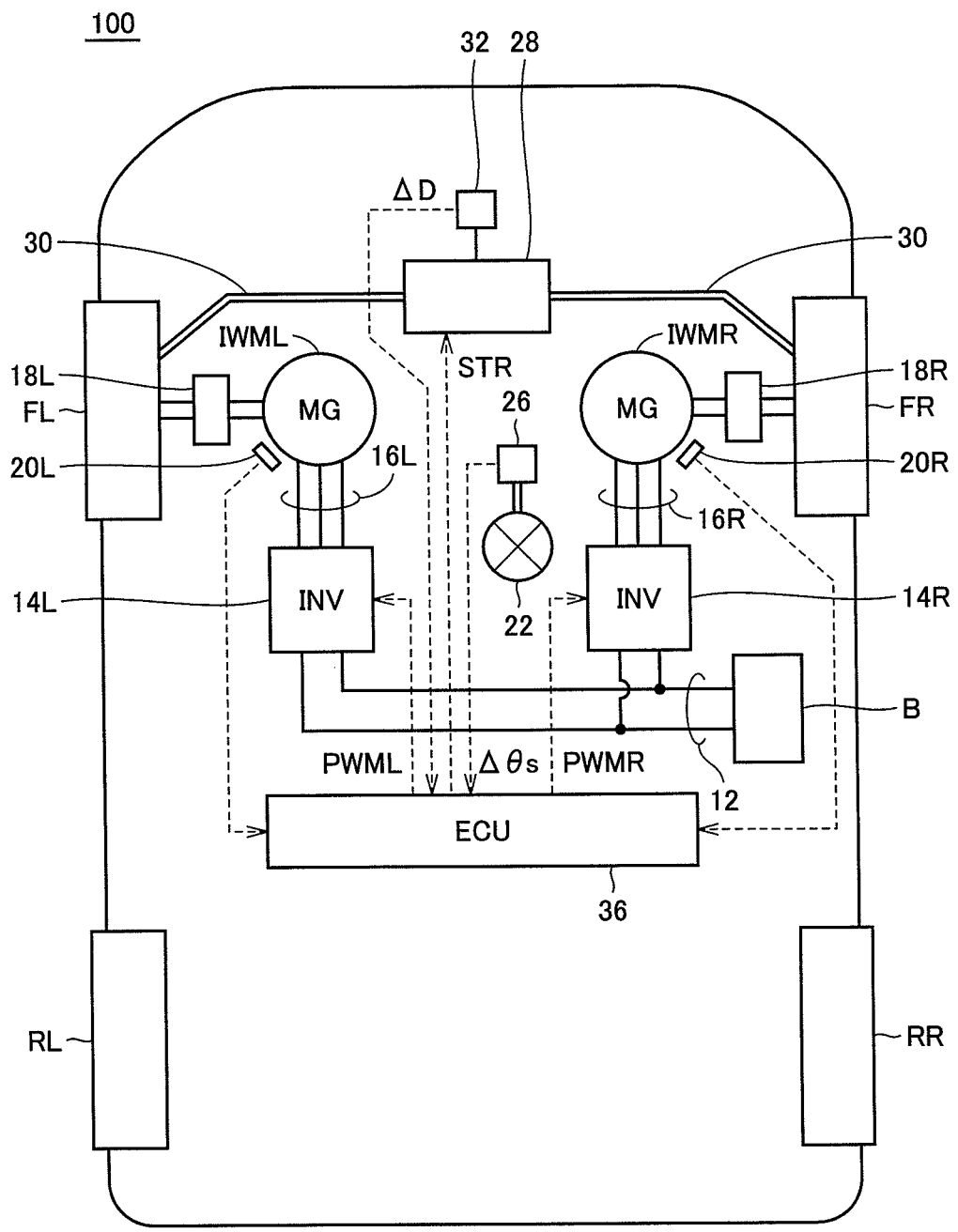
FIG. 1 is a functional block diagram showing an overall configuration of an electrically powered vehicle according to an embodiment of the present invention.

An embodiment of the present invention will be described hereinafter in detail with reference to the drawings. In the drawings, the same or corresponding elements have the same reference characters allotted, and detailed description thereof will not be repeated.

FIG. 1 is a functional block diagram showing an overall configuration of an electrically powered vehicle according to an embodiment of the present invention. Referring to FIG. 1, an electrically powered vehicle 100 includes a power storage apparatus B, a power supply cable 12, inverters 14R, 14L, three-phase cables 16R, 16L, motor-generators IWMR, IWML, reduction gears 18R, 18L, front wheels FR, FL, rear wheels RR, RL, and rotation sensors 20R, 20L. In addition, electrically powered vehicle 100 further includes a steering wheel 22, a steering wheel angle sensor 26, a steering actuator 28, a tie rod 30, a steering angle sensor 32, and an electronic control unit (hereinafter also referred to as "ECU") 36.

Power storage apparatus B is connected to power supply cable 12. Inverters 14R, 14L are connected to power supply cable 12 in parallel to each other. Motor-generators IWMR, IWML are connected to inverters 14R, 14L via three-phase cables 16R, 16L, respectively. Output shafts of motor-generators IWMR, IWML are mechanically coupled to rotation shafts of front wheels FR, FL via reduction gears 18R, 18L, respectively. In addition, front wheels FR, FL are mechanically coupled to steering actuator 28 via a not-shown knuckle arm and tie rod 30.

Power storage apparatus B is a direct-current power supply capable of charging and discharging, and it is implemented, for example, by a secondary battery such as a nickel metal hydride battery and a lithium ion battery. Power storage apparatus B supplies DC power to inverters 14R, 14L through power supply cable 12. In addition, power storage apparatus B is charged by inverters 14R, 14L during regenerative braking using motor-generators IWMR, IWML. A capacitor of a large capacity may be employed as power storage apparatus B.

Inverter 14R converts the DC power received from power storage apparatus B to three-phase AC power based on a signal PWMR from ECU 36, and outputs the converted three-phase AC power to motor-generator IWMR. Motor-generator IWMR is thus driven to generate designated torque. In addition, during regenerative braking of the vehicle, inverter 14R converts to DC power, three-phase AC power generated by motor-generator IWMR upon receiving rotational force from front wheel FR, based on signal PWMR from ECU 36, and outputs the converted DC power to power storage apparatus B.

Motor-generator IWMR is a three-phase AC motor, and it is implemented, for example, by a three-phase AC synchronous motor. Motor-generator IWMR generates drive torque for a vehicle, using the three-phase AC power received from inverter 14R. In addition, during regenerative braking of the vehicle, motor-generator IWMR generates three-phase AC power and outputs the same to inverter 14R.

Reduction gear 18R transmits to front wheel FR, the torque and a rotation speed output from motor-generator IWMR at a prescribed reduction ratio. As will be described later, motor-generator IWMR and reduction gear 18R are arranged in an integrated manner in the wheel of front wheel FR. Namely, motor-generator IWMR and reduction gear 118R form what is called an in-wheel motor.

As the configurations of inverter 14L, motor-generator IWML and reduction gear 18L are similar to those of inverter 14R, motor-generator IWMR and reduction gear 18R respectively, description thereof will not be repeated.

Rotation sensor 20R generates a signal that varies in accordance with a rotation angle of motor-generator IWMR and outputs the signal to ECU 30. Rotation sensor 20L generates a signal that varies in accordance with a rotation angle of motor-generator IWML and outputs the signal to ECU 30. As will be described later, rotation sensors 20R, 20L are actually implemented by resolvers incorporated in motor-generators IWMR, IWML respectively.

Steering wheel 22 serves as an operation end for providing a steering angle (or also referred to as "steer angle") to front wheels FR, FL. Steering wheel angle sensor 26 detects an operation angle $\Delta\theta s$ of steering wheel 22 and outputs detected operation angle $\Delta\theta s$ to ECU 36. Steering actuator 28 provides displacement in an axial direction to tie rod 30 based on a signal STR from ECU 36. Tie rod 30 provides a steering angle in accordance with an amount of displacement in the axial direction provided by steering actuator 28 to front wheels FR, FL. Steering angle sensor 32 detects a steering angle $\Delta D$ of front wheels FR, FL based on an amount of operation of steering actuator 28 and outputs detected steering angle $\Delta D$ to ECU 36.

ECU 36 generates signal STR for providing a steering angle to front wheels FR, FL based on operation angle $\Delta\theta s$ of steering wheel 22 from steering wheel angle sensor 26, and outputs generated signal STR to steering actuator 28.

In addition, ECU 36 calculates a rotation speed of motor-generators IWMR, IWML based on a signal from rotation sensors 20R, 20L. Then, ECU 36 generates torque instructions for motor-generators IWMR, IWML based on an amount of operation of an accelerator pedal and a brake pedal (neither of which is shown here and hereafter), the calculated rotation speed of motor-generators IWMR, IWML and the like.

Here, ECU 36 determines whether or not the steering apparatus including steering actuator 28, tie rod 30 and steering angle sensor 32 has failed, based on operation angle $\Delta\theta s$ of steering wheel 22 from steering wheel angle sensor 26 and steering angle $\Delta D$ of front wheels FR, FL from steering angle sensor 32. Then, when ECU 36 determines that the steering apparatus has failed, ECU 36 provides the torque difference for the torque instructions for motor-generators IWMR, IWML in accordance with operation angle $\Delta\theta s$ of steering wheel 22.

Thereafter, ECU 36 generates signals PWMR, PWML for driving inverters 14R, 14L based on the torque instructions for motor-generators IWMR, IWML respectively, and outputs generated signals PWMR, PWML to inverters 14R, 14L respectively.

In electrically powered vehicle 100, the steer-by-wire system in which steering wheel 22 and front wheels FR, FL are mechanically separate is employed. Specifically, operation angle Δθs of steering wheel 22 is converted to an electric signal by steering wheel angle sensor 26 and transmitted to ECU 36 through an electric wire (wire). Then, ECU 36 generates signal STR based on operation angle Δθs of steering wheel 22, and transmits generated signal STR to steering actuator 28 through the electric wire.

In electrically powered vehicle 100, determination of failure of the steering apparatus including steering actuator 28, tie rod 30 and steering angle sensor 32 is made based on operation angle Δθs of steering wheel 22 from steering wheel angle sensor 26 and steering angle ΔD of front wheels FR, FL from steering angle sensor 32. When failure of the steering apparatus is detected, the torque difference is provided for the torque instruction for motor-generators IWMR, IWML. Then, the torque difference in accordance with operation angle Δθs of steering wheel 22 is produced in front wheels FR, FL and torque steer in accordance with the torque difference is produced. Thus, even if the steering apparatus has failed, the steering function by steering wheel 22 is ensured.

Figure 2:
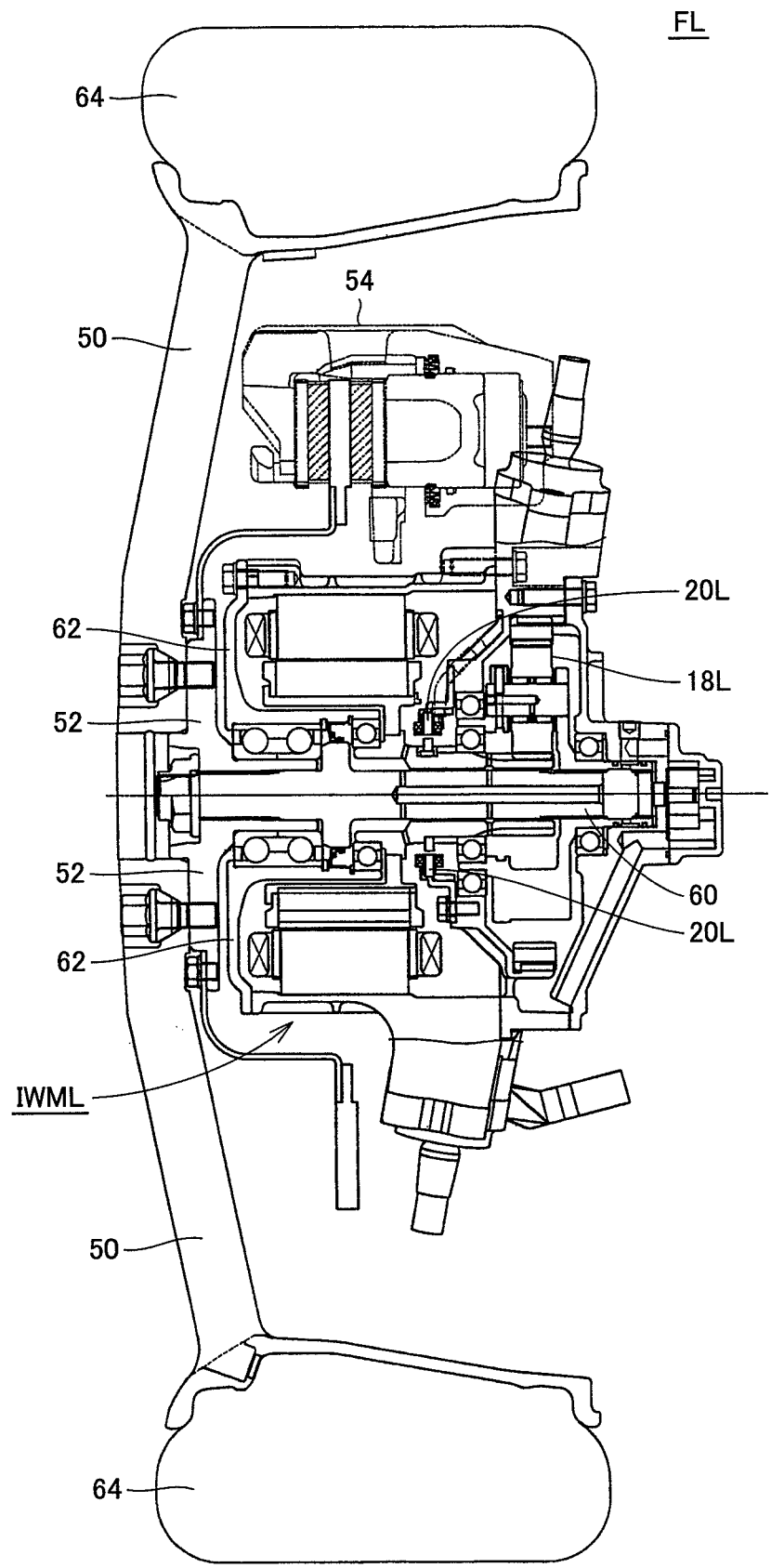
FIG. 2 is a cross-sectional view of a front wheel in which a motor-generator shown in FIG. 1 is incorporated as an in-wheel motor.

FIG. 2 is a cross-sectional view of front wheel FL in which motor-generator IWML shown in FIG. 1 is incorporated as an in-wheel motor. As front wheel FR in which motor-generator IWMR is incorporated as an in-wheel motor is configured similarly, the configuration of front wheel FL is shown as a representative in FIG. 2.

Referring to FIG. 2, front wheel FL includes a wheel disc 50, a wheel hub 52, a brake caliper 54, motor-generator IWML, reduction gear 18L, rotation sensor 20L, a shaft 60, a case 62, and a tire 64.

Wheel disc 50 is substantially in a cup shape and fastened to wheel hub 52 by means of a screw. Wheel hub 52 is coupled to shaft 60 and supported by a hub bearing in a manner rotatable with respect to an axial direction of shaft 60. Brake caliper 54 sandwiches an outer peripheral end of a brake rotor with brake pads, for braking of front wheel FL.

Motor-generator IWML, reduction gear 18L and rotation sensor 20L are accommodated in case 62. A stator core of motor-generator IWML is provided securely in case 62 and a rotor is provided on an inner circumference of the stator core.

Reduction gear 18L is a planetary gear constituted of a sun gear, a pinion gear, a ring gear, and a planetary carrier. A sun gear shaft is coupled to the rotor of motor-generator IWML and the planetary carrier is coupled to shaft 60.

Rotation sensor 20L is implemented by a resolver incorporated in motor-generator IWML. Rotation sensor 20L generates a signal that varies in accordance with a rotation angle of motor-generator IWML based on detection of a rotation angle of the sun gear shaft coupled to the rotor of motor-generator IWML. A rotation angle of the rotor of motor-generator IWML may directly be detected, instead of detection of the rotation angle of the sun gear shaft.

Figure 3:
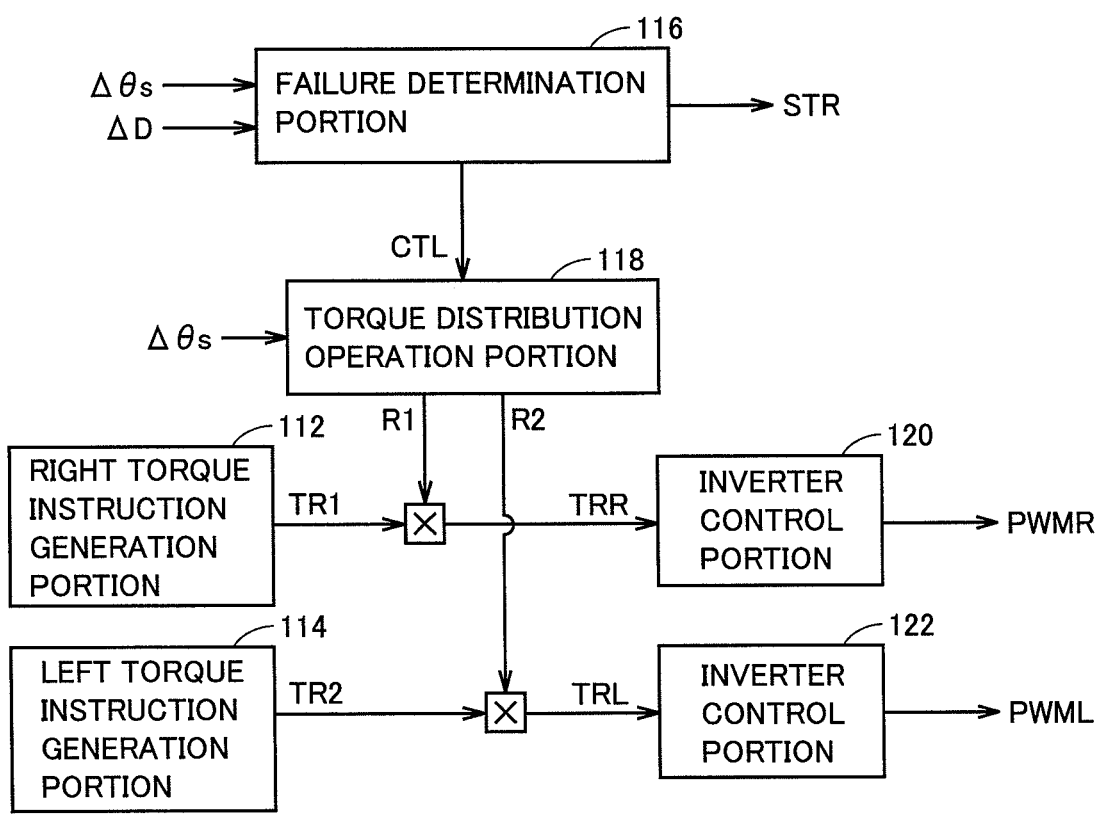
FIG. 3 is a functional block diagram of an ECU shown in FIG. 1.

FIG. 3 is a functional block diagram of ECU 36 shown in FIG. 1. Referring to FIG. 3, ECU 36 includes a right torque instruction generation portion 112, a left torque instruction generation portion 114, a failure determination portion 116, a torque distribution operation portion 118, and inverter control portions 120, 122.

Right torque instruction generation portion 112 generates a torque instruction TR1 for motor-generator IWMR based on the amount of operation of the accelerator pedal and the brake pedal, the rotation speed of motor-generator IWMR calculated based on the signal from rotation sensor 20R, and the like. Left torque instruction generation portion 114 generates a torque instruction TR2 for motor-generator IWML based on the amount of operation of the accelerator pedal and the brake pedal, the rotation speed of motor-generator IWML calculated based on the signal from rotation sensor 20L, and the like.

Failure determination portion 116 determines whether or not the steering apparatus including steering actuator 28, tie rod 30 and steering angle sensor 32 has failed, based on operation angle Δθs of steering wheel 22 from steering wheel angle sensor 26 and steering angle ΔD of front wheels FR, FL from steering angle sensor 32.

For example, failure determination portion 116 calculates the operation angle of steering wheel 22 corresponding to steering angle ΔD from steering angle sensor 32 using a relational expression between the operation angle of steering wheel 22 and the steering angle of front wheels FR, FL or a map that is set in advance, and if difference between the calculated operation angle and operation angle Δθs detected by steering wheel angle sensor 26 is greater than a threshold value set in advance, failure determination portion 116 determines that the steering apparatus has failed. Alternatively, failure determination portion 116 may calculate the steering angle of front wheels FR, FL corresponding to operation angle Δθs from steering wheel angle sensor 26, and if difference between the calculated steering angle and steering angle ΔD detected by steering angle sensor 32 is greater than a threshold value set in advance, failure determination portion 116 may determine that the steering apparatus has failed.

When failure determination portion 116 determines that the steering apparatus is normal, failure determination portion 116 generates signal STR for providing the steering angle to front wheels FR, FL based on operation angle Δθs of steering wheel 22 from steering wheel angle sensor 26 and outputs generated signal STR to steering actuator 28. In addition, failure determination portion 116 inactivates a signal CTL and outputs the signal to torque distribution operation portion 118.

On the other hand, when failure determination portion 116 determines that the steering apparatus has failed, failure determination portion 116 activates signal CTL without outputting signal STR to steering actuator 28, and outputs signal CTL to torque distribution operation portion 118.

While signal CTL from failure determination portion 116 is active, torque distribution operation portion 118 calculates torque distribution between motor-generators IWMR, IWML for providing the torque difference to the output torque of motor-generators IWMR, IWML based on operation angle Δθs of steering wheel 22 from steering wheel angle sensor 26.

More specifically, torque distribution operation portion 118 has a torque increase/decrease rate for motor-generators IWMR, IWML in accordance with the operation angle of steering wheel 22 as a map or an expression in advance, for each accelerator position of the accelerator pedal and the rotation speed of motor-generators IWMR, IWML (or vehicle speed). Then, using the map or the expression, torque distribution operation portion 118 calculates respective torque increase/decrease rates R1, R2 for motor-generators IWMR, IWML based on operation angle Δθs of steering wheel 22 from steering wheel angle sensor 26 as well as on the accelerator position of the accelerator pedal and the rotation speed of motor-generators IWMR, IWML (or vehicle speed). Torque increase/decrease rates R1, R2 are values greater than 1 for a motor-generator that increases torque, while torque increase/decrease rates R1, R2 are values smaller than 1 for a motor-generator that decreases torque.

While signal CTL from failure determination portion 116 is inactive, torque distribution operation portion 118 sets both of torque increase/decrease rates R1, R2 for motor-generators IWMR, IWML to 1.

Inverter control portion 120 generates a PWM (Pulse Width Modulation) signal for driving inverter 14R based on a right torque instruction TRR obtained by multiplying torque instruction TR1 from right torque instruction generation portion 112 by torque increase/decrease rate R1 for motor-generator IWMR from torque distribution operation portion 118, and outputs the generated PWM signal to inverter 14R as signal PWMR.

Inverter control portion 122 generates a PWM signal for driving inverter 14L based on a left torque instruction TRL obtained by multiplying torque instruction TR2 from left torque instruction generation portion 114 by torque increase/decrease rate R2 for motor-generator IWML from torque distribution operation portion 118, and outputs the generated PWM signal to inverter 14L as signal PWML.

Thus, according to ECU 36, when failure determination portion 116 determines that the steering apparatus has failed, torque distribution operation portion 118 calculates torque distribution between motor-generators IWMR, IWML in accordance with operation angle $\Delta\theta s$ of steering wheel 22. Then, torque instructions TR1, TR2 from right torque instruction generation portion 112 and left torque instruction generation portion 114 are corrected based on the calculated torque distribution. Consequently, torque difference in accordance with operation angle $\Delta\theta s$ of steering wheel 22 is provided to the output torque of motor-generators IWMR, IWML and torque steer control in accordance with the operation of steering wheel 22 is achieved.

As described above, in the present embodiment, even when the steering apparatus including steering actuator 28, tie rod 30 and steering angle sensor 32 fails, torque steer control is carried out, utilizing the torque difference provided to motor-generators IWMR, IWML in accordance with operation angle $\Delta\theta s$ of steering wheel 22. Therefore, according to the present embodiment, even when the steering apparatus fails, the steering function is ensured. Consequently, reliability of the steering system and electrically powered vehicle 100 is improved.

In addition, as the steering apparatus in electrically powered vehicle 100 adopts the steer-by-wire system, while enjoying advantages of the steer-by-wire system such as improvement in a degree of freedom in steering layout or a smaller size of the steering apparatus, reliability of the steering system can be improved.

Moreover, as electrically powered vehicle 100 is driven with an in-wheel motor drive system, effective use of a space that has conventionally been occupied by a drive system can be achieved and other various advantages owing to the in-wheel motor drive system can be enjoyed.

In the embodiment described above, an example where the steering apparatus adopts the steer-by-wire system has been described, however, the present invention may be applicable also to an oil-hydraulic or electric power steering apparatus. Specifically, even if an oil-hydraulic system in an oil-hydraulic power steering apparatus or a motor in an electric power steering apparatus has failed, the steering function can be ensured by producing torque difference in accordance with operation angle $\Delta\theta s$ of steering wheel 22 in the output torque of motor-generators IWMR, IWML.

In addition, in the embodiment described above, electrically powered vehicle 100 is driven by the in-wheel motor, however, applications of the present invention are not necessarily limited to the in-wheel motor drive system. The present invention is applicable to an electrically powered vehicle in which left and right front wheels are driven with separate motors, and an on-board type electrically powered vehicle in which motors driving left and right front wheels are mounted on a car body is also encompassed in applications of the present invention, although the in-wheel motor drive system is suitable.

The electrically powered vehicle according to the present invention also encompasses a hybrid vehicle incorporating also an internal combustion engine as a power source. In addition, the electrically powered vehicle according to the present invention also encompasses a fuel cell vehicle incorporating a fuel cell as a DC power supply instead of or in addition to power storage apparatus B.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

The invention claimed is:

1. A steering control device for steering a vehicle upon failure of a steering apparatus, comprising:
   a steering wheel;
   first and second motors driving left and right front wheels respectively;
   a failure determination means for determining whether the steering apparatus providing a steering angle to said front wheels in accordance with an operation angle of said steering wheel has failed, upon detecting a failure the failure determination means sends a failure signal to a control means, and upon detecting no failure the failure determination means produces a steering signal based on the operation angle of the steering wheel; and
   the control means for receiving the failure signal and for producing a torque difference between an output torque of the first motor and an output torque of the second motor based upon the operation angle of said steering wheel when said failure determination means determines that said steering apparatus has failed, the vehicle being steered according to the torque difference and not according to the steering signal, and
   wherein the left front wheel being driven based on a left torque instruction and the right front wheel being driven based on a right torque instruction, the left torque instruction being increased or decreased by a torque increase/decrease rate for said first motor and the right torque instruction being increased or decreased by a torque increase/decrease rate for said second motor only upon a determination that the steering apparatus has failed,
   wherein said control means calculates, when it is determined that said steering apparatus has failed, the torque increase/decrease rate for said first motor and the torque increase/decrease rate for said second motor based on the operation angle of said steering wheel, an amount of operation of an accelerator pedal, and respective rotation speeds of said first and second motors, using a relational expression or a map in which the respective torque increase/decrease rates for said first and second motors in accordance with the operation angle of said steering wheel are predetermined for each amount of operation of said accelerator pedal and for each rotation speed of said first and second motors,
   wherein the first and second motors each have a rotation angle sensor for determining a rotation angle of the first and second motors, respectively, and wherein the control means calculates the left torque instruction and the right torque instructions based on a signal of the rotation angle from each rotation angle sensor.

2. The steering control device according to claim 1, wherein said steering apparatus adopts a steer-by-wire system in which said steering wheel and said front wheels are mechanically separate.

3. The steering control device according to claim 1, further comprising a steering angle sensor detecting a steering angle of said front wheels, wherein said failure determination means is configured to calculate at least one of a calculated steering angle of said front wheels based on the operation angle of said steering wheel and a calculated operation angle of said steering wheel based on the steering angle of said front wheels, is configured to compare at least one of the calculated steering angle with the steering angle and the calculated operation angle with the operation angle, and is configured to determine whether said steering apparatus has failed if a difference between at least one of the calculated steering angle and the steering angle, and the calculated operation angle and the operation angle exceeds a threshold value.

4. A steering control device for steering a vehicle upon failure of a steering apparatus, comprising:
a steering wheel;
first and second motors driving left and right front wheels respectively; and
a control unit determining whether the steering apparatus providing a steering angle to said front wheels in accordance with an operation angle of said steering wheel has failed, upon detecting a failure the control unit produces a failure signal, and upon detecting no failure the control unit produces a steering signal based on the operation angle of the steering wheel,
wherein as a result of detecting the failure the vehicle is steered according to a torque difference between an output torque of the first motor and an output torque of the second motor based upon the operation angle of said steering wheel and not according to the steering signal, and
wherein the left front wheel being driven based on a left torque instruction and the right front wheel being driven based on a right torque instruction, the left torque instruction being increased or decreased by a torque increase/decrease rate for said first motor and the right torque instruction being increased or decreased by a torque increase/decrease rate for said second motor only upon a determination that the steering apparatus has failed,
wherein said control unit calculates, when it is determined that said steering apparatus has failed, the torque increase/decrease rate for said first motor and the torque increase/decrease rate for said second motor based on the operation angle of said steering wheel, an amount of operation of an accelerator pedal, and respective rotation speeds of said first and second motors, using a relational expression or a map in which the respective torque increase/decrease rates for said first and second motors in accordance with the operation angle of said steering wheel are predetermined for each amount of operation of said accelerator pedal and for each rotation speed of said first and second motors, wherein the first and second motors each have a rotation angle sensor for determining a rotation angle of the first and second motors, respectively, and
wherein the control unit calculates the left torque instruction and the right torque instructions based on a signal of the rotation angle from each rotation angle sensor.

5. The steering control device according to claim 4, wherein
said steering apparatus adopts a steer-by-wire system in which said steering wheel and said front wheels are mechanically separate.

6. The steering control device according to claim 4, further comprising a steering angle sensor detecting a steering angle of said front wheels, wherein
said control unit is configured to calculate at least one of a calculated steering angle of said front wheels based on the operation angle of said steering wheel and a calculated operation angle of said steering wheel based on the steering angle of said front wheels, is configured to compare at least one of the calculated steering angle with the steering angle and the calculated operation angle with the operation angle, and is configured to determine whether said steering apparatus has failed if a difference between at least one of the calculated steering angle and the steering angle, and the calculated operation angle and the operation angle exceeds a threshold value.

7. An electrically powered vehicle that can be steered upon failure of a steering apparatus, comprising:
a power storage apparatus;
first and second motors driving left and right front wheels respectively, by receiving electric power supplied from said power storage apparatus;
a steering wheel;
the steering apparatus providing a steering angle to said front wheels in accordance with an operation angle of said steering wheel;
failure determination means for determining whether said steering apparatus has failed, upon detection of a failure sending a failure signal to a control means, and upon detection of no failure producing a steering signal based on the operation angle of said steering wheel; and
the control means for receiving the failure signal and for producing a torque difference between an output torque of the first motor and an output torque of the second motor based upon the operation angle of said steering wheel when said failure determination means determines that said steering apparatus has failed, the vehicle being steered according to the torque difference and not according to the steering signal;
wherein the left front wheel being driven based on a left torque instruction and the right front wheel being driven based on a right torque instruction, the left torque instruction being increased or decreased by a torque increase/decrease rate for said first motor and the right torque instruction being increased or decreased by a torque increase/decrease rate for said second motor only upon a determination that the steering apparatus has failed,
wherein said control means calculates, when it is determined that said steering apparatus has failed, the torque increase/decrease rate for said first motor and the torque increase/decrease rate for said second motor based on the operation angle of said steering wheel, an amount of operation of an accelerator pedal, and respective rotation speeds of said first and second motors, using a relational expression or a map in which the respective torque increase/decrease rates for said first and second motors in accordance with the operation angle of said steering wheel are predetermined for each amount of operation of said accelerator pedal and for each rotation speed of said first and second motors, wherein the first and second motors each have a rotation angle sensor for determining a rotation angle of the first and second motors, respectively, and wherein the control means calculates the left torque instruction and the right torque instructions based on a signal of the rotation angle from each rotation angle sensor.

8. The electrically powered vehicle according to claim 7, wherein said first motor is provided in a wheel of said right front wheel, and said second motor is provided in a wheel of said left front wheel.

9. An electrically powered vehicle that can be steered upon failure of a steering apparatus, comprising:

a power storage apparatus;

first and second motors driving left and right front wheels respectively, by receiving electric power supplied from said power storage apparatus;

a steering wheel;

the steering apparatus providing a steering angle to said front wheels in accordance with an operation angle of said steering wheel; and a control unit determining whether said steering apparatus has failed, upon detection of a failure sending a failure signal to the control unit, and upon detection of no failure producing a steering signal based on the operation angle of said steering wheel, as a result of determining the failure, the control unit producing a torque difference between an output torque of the first motor and an output torque of the second motor based upon the operation angle of said steering wheel when it is determined that said steering apparatus has failed, the vehicle being steered according to the torque difference and not according to the steering signal, wherein the left front wheel being driven based on a left torque instruction and the right front wheel being driven based on a right torque instruction, the left torque instruction being increased or decreased by a torque increase/decrease rate for said first motor and the right torque instruction being increased or decreased by a torque increase/decrease rate for said second motor only upon a determination that the steering apparatus has failed, wherein said control unit calculates, when it is determined that said steering apparatus has failed, the torque increase/decrease rate for said first motor and the torque increase/decrease rate for said second motor based on the operation angle of said steering wheel, an amount of operation of an accelerator pedal, and respective rotation speeds of said first and second motors, using a relational expression or a map in which the respective torque increase/decrease rates for said first and second motors in accordance with the operation angle of said steering wheel are predetermined for each amount of operation of said accelerator pedal and for each rotation speed of said first and second motors, wherein the first and second motors each have a rotation angle sensor for determining a rotation angle of the first and second motors, respectively, and wherein the control means calculates the left torque instruction and the right torque instructions based on a signal of the rotation angle from each rotation angle sensor.

* * * * *